(12) United States Patent
Kurita et al.

(10) Patent No.: US 7,733,801 B2
(45) Date of Patent: Jun. 8, 2010

(54) NETWORK DEVICE MANAGEMENT APPARATUS, NETWORK DEVICE MANAGEMENT PROGRAM, AND NETWORK DEVICE MANAGEMENT METHOD

(75) Inventors: Toshihiko Kurita, Kawasaki (JP); Hiroyuki Yamashima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1240 days.

(21) Appl. No.: 11/214,840

(22) Filed: Aug. 31, 2005

(65) Prior Publication Data

US 2006/0221862 A1    Oct. 5, 2006

(30) Foreign Application Priority Data

Mar. 30, 2005   (JP) .............................. 2005-098947

(51) Int. Cl.
*H04L 12/28* (2006.01)
(52) U.S. Cl. ..................................................... 370/254
(58) Field of Classification Search ................ 370/254, 370/351; 709/238
See application file for complete search history.

(56) References Cited

U.S. PATENT DOCUMENTS

| | | | |
|---|---|---|---|
| 5,233,604 A * | 8/1993 | Ahmadi et al. .............. | 370/238 |
| 5,491,690 A * | 2/1996 | Alfonsi et al. .............. | 370/404 |
| 5,608,721 A * | 3/1997 | Natarajan et al. ........... | 370/238 |
| 5,732,072 A * | 3/1998 | Thanner et al. ............. | 370/255 |
| 6,226,673 B1 * | 5/2001 | Yoshimoto ................. | 709/223 |
| 6,314,093 B1 * | 11/2001 | Mann et al. ................. | 370/351 |
| 7,366,108 B2 * | 4/2008 | Szentesi et al. ............. | 370/254 |
| 7,583,796 B2 | 9/2009 | Tomikawa et al. | |

FOREIGN PATENT DOCUMENTS

| | | |
|---|---|---|
| JP | 11-55258 | 2/1999 |
| JP | 2002-14920 | 1/2002 |
| JP | 2002-232466 | 8/2002 |
| JP | 2004-199578 | 7/2004 |

OTHER PUBLICATIONS

Japanese Office Action dated Oct. 23, 2007 in corresponding Japanese Application No. 2005-098947.
Japanese Office Action dated Jan. 19, 2010 issued in corresponding Japanese Patent Application No. 2007-330143.

* cited by examiner

*Primary Examiner*—Kevin Bates
*Assistant Examiner*—Robert B McAdams

(57) ABSTRACT

A network device management apparatus which generates distribution routes for transmitting distribution information via communication devices, in order to distribute information to plural communication devices connected to a network, and makes the distribution information be transmitted in accordance with the generated distribution routes. The apparatus comprises: a hierarchy structure creation section that creates, based on units and the number of communication devices to which the distribution information is to be distributed, a hierarchy structure constituted by the units of communication devices as constitutional elements; and a distribution control section that controls distribution of the distribution information, by use of the hierarchy structure created by the hierarchy structure creation section. Therefore, the network device management apparatus can reduce the total distribution time and distribute information efficiently when the information is distributed to a huge number of communication devices.

17 Claims, 13 Drawing Sheets

DISTRIBUTION ROUTES OF FRACTIONAL TYPE (X=2, Y=3) [FIVE DEVICES IN THE LAST LAYER, FRACTION=3] (PARTS ILLUSTRATED WITH BROKEN LINES INCLUDE NO DEVICE (OR CORRESPOND TO THE FRACTION) AND DEVICES ARE ARRANGED IN THE NUMERICAL ORDER IN THE LAST LAYER)

FIG. 6A

DISTRIBUTION ROUTES OF COMPLETE TYPE (x=2, y=3) [WITH NO FRACTION]

FIG. 8

| ITEM<br>DEVICE | IP ADDRESS | NETMASK | SUBNET |
|---|---|---|---|
| NETWORK DEVICE MANAGEMENT APPARATUS | 192.168.1.1 | /24 | 192.168.1.0 (SUBNET-1) |
| COMMUNICATION DEVICE-1 | 192.168.1.10 | /24 | 192.168.1.0 (SUBNET-1) |
| COMMUNICATION DEVICE-2 | 192.168.1.11 | /24 | 192.168.1.0 (SUBNET-1) |
| COMMUNICATION DEVICE-3 | 192.168.2.20 | /24 | 192.168.2.0 (SUBNET-2) |
| COMMUNICATION DEVICE-4 | 192.168.2.21 | /24 | 192.168.2.0 (SUBNET-2) |
| COMMUNICATION DEVICE-5 | 192.168.3.30 | /24 | 192.168.3.0 (SUBNET-3) |
| COMMUNICATION DEVICE-6 | 192.168.3.31 | /24 | 192.168.3.0 (SUBNET-3) |
| COMMUNICATION DEVICE-7 | 192.168.4.40 | /24 | 192.168.4.0 (SUBNET-4) |
| COMMUNICATION DEVICE-8 | 192.168.4.41 | /24 | 192.168.4.0 (SUBNET-4) |

DEVICE CHARACTERISTICS

FIG. 9

⟨NUMBER OF HOPS BETWEEN DEVICES⟩

| | MANAGEMENT APPARATUS | COMMUNI-CATION DEVICE -1 | COMMUNI-CATION DEVICE -2 | COMMUNI-CATION DEVICE -3 | COMMUNI-CATION DEVICE -4 | COMMUNI-CATION DEVICE -5 | COMMUNI-CATION DEVICE -6 | COMMUNI-CATION DEVICE -7 | COMMUNI-CATION DEVICE -8 |
|---|---|---|---|---|---|---|---|---|---|
| NETWORK DEVICE MANAGEMENT APPARATUS | | 0 | 0 | 1 | 1 | 2 | 2 | 2 | 2 |
| COMMUNICATION DEVICE -1 | 0 | | | 1 | 1 | 2 | 2 | 2 | 2 |
| COMMUNICATION DEVICE -2 | 0 | 0 | | 1 | 1 | 2 | 2 | 2 | 2 |
| COMMUNICATION DEVICE -3 | 1 | 1 | 1 | | 0 | 1 | 1 | 1 | 1 |
| COMMUNICATION DEVICE -4 | 1 | 1 | 1 | 0 | | 1 | 1 | 1 | 1 |
| COMMUNICATION DEVICE -5 | 2 | 2 | 2 | 1 | 1 | | 0 | 2 | 2 |
| COMMUNICATION DEVICE -6 | 2 | 2 | 2 | 1 | 1 | 0 | | 2 | 2 |
| COMMUNICATION DEVICE -7 | 2 | 2 | 2 | 1 | 1 | 2 | 2 | | 0 |
| COMMUNICATION DEVICE -8 | 2 | 2 | 2 | 1 | 1 | 2 | 2 | 0 | |

INTER-DEVICE CHARACTERISTICS

AFTER MERGE

FIG. 14A

ORIGINAL ORDER CONDITIONS

NETWORK DEVICE MANAGEMENT APPARATUS, NETWORK DEVICE MANAGEMENT PROGRAM, AND NETWORK DEVICE MANAGEMENT METHOD

BACKGROUND OF THE INVENTION

1. Field of the Invention

The present invention relates to a network device management apparatus, network device management program, and network device management method in which when information is distributed to a large number of communication devices, distribution routes thereof are created and then the information is distributed.

2. Description of the Related Art

Figure 15:
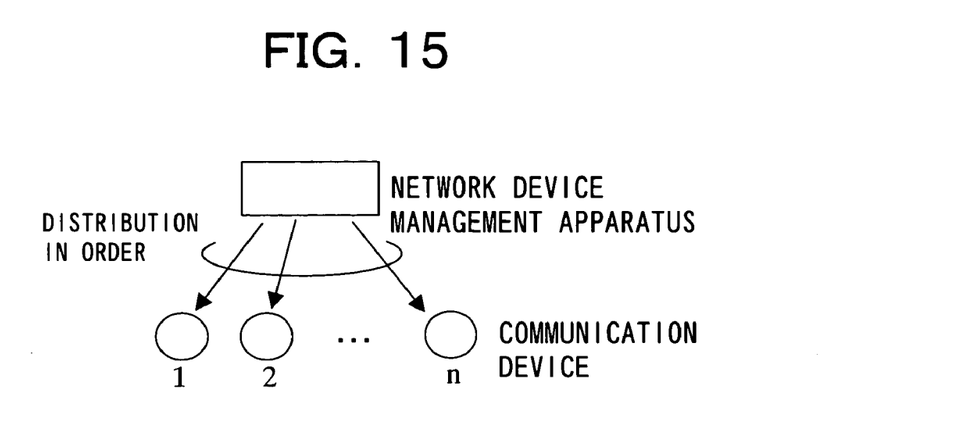
FIG. 15 is a view showing distribution routes according to a known individual-distribution method.
Figure 16:
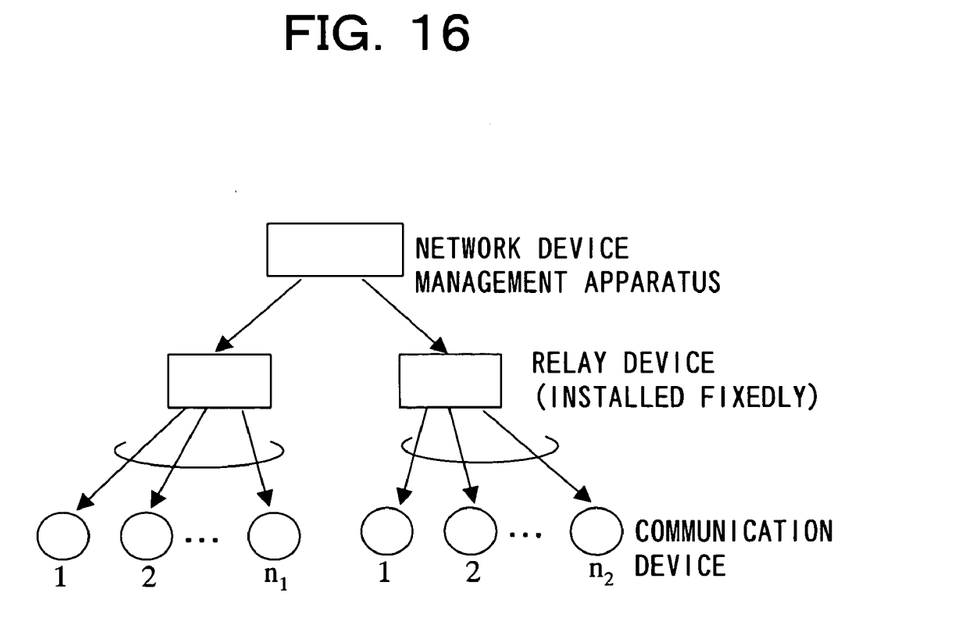
FIG. 16 is a view showing distribution routes according to a known relay-device installation method.

When a management apparatus distributes, for example, control information to plural communication devices constituting a network, the control information is distributed to all the communication devices in sequential order, in an individual distribution method, as shown in FIG. 15. Alternatively, as shown in FIG. 16, in a relay device installation method, a relay device is provided and the control information is distributed via the relay device. These are known techniques.

For example, in the Japanese Patent Application Laid-Open Publication No. 2002-14920, a calculator of an information distributor having requested information which is necessary for a calculator of an information distribution destination receives an information supply request from the calculator of the information distribution destination. The calculator of the information distributor constructs a network path, as a network path from the calculator of the information distributor to the calculator of the information distribution destination via an information relay calculator, for every attribute of the requested information, and distributes the requested information to the calculator of the information distribution destination.

However, in case of adopting the individual distribution method as described above, information is distributed to all devices in sequential order. Therefore, the total distribution time increases, substantially in proportion to the number of devices. For example, where n is the number of communication devices to which information should be distributed, the total distribution time is n times longer the time required for distributing information to one device. If there are a huge number of communication devices, the total distribution time is too long to respond to.

Alternatively, in case of adopting the relay device installation method, the relay device is fixed. Therefore, an advantage of reducing total transfer time cannot be expected, depending on the number of distribution destinations and the installation location. In addition, since the relay device has to be installed optionally, costs may be increased due to costs for the apparatus itself, installation space, and management of the apparatus.

SUMMARY OF THE INVENTION

The present invention has been made in view of the problems described above, and has an object of providing a network device management apparatus, a network device management program, and a network device management method which are capable of reducing total distribution time and of efficiently distributing information, when information is distributed to a huge number of communication devices.

To achieve the above object, according to an aspect of the present invention, there is provided a network device management apparatus which generates distribution routes for transmitting distribution information via communication devices, in order to distribute information to plural communication devices connected to a network, and makes the distribution information be transmitted in accordance with the generated distribution routes, the apparatus comprising: a hierarchy structure creation section that creates, based on units and the number of communication devices to which the distribution information is to be transmitted, a hierarchy structure constituted by the units of communication devices as constitutional elements; and a distribution control section that controls distribution of the distribution information, by use of the hierarchy structure created by the hierarchy structure creation section.

In the network device management apparatus, if the hierarchy structure is constructed from an uppermost level where n is the number of the units of communication devices, x is the identical number of other units of communication devices than one of the units of communication devices through which the distribution information is to be distributed to the other units, and y is the number of layers constituting the hierarchy structure, the hierarchy structure creation section creates the hierarchy structure so as to minimize the value of x×y which satisfies:

$$\Sigma x^i (\text{where } i=1 \text{ to } y-1) \leq n < \Sigma x^i (\text{where } i=1 \text{ to } y).$$

Also, in the network device management apparatus, if there are plural combinations each of which minimizes the value of x×y, the hierarchy structure creation section creates the hierarchy structure by selecting one of the combinations which minimizes $\Sigma x^i - n$ (where i=1 to y).

Further, if there are plural combinations each of which minimizes $\Sigma x^i - n$ (where i=1 to y), the hierarchy structure creation section creates the hierarchy structure by selecting a combination in which the value of x is greater.

Also, in the network device management apparatus of the present invention, the hierarchy structure creation section creates the hierarchy structure so as to distribute the distribution information to the communication devices in order from a communication device having a shorter network distance between two of the units of communication devices.

In the network device management apparatus, if a distribution order of communication devices is given, the hierarchy structure creation section may create the hierarchy structure by assigning the units of communication devices to the hierarchy structure, on the basis of the distribution order.

Also, the hierarchy structure creation section may form the units of communication devices each as an independent distribution group including no overlapping part, by collecting together parts common to the distribution order.

Further, the hierarchy structure creation section may form the units of communication devices each by assigning one or more communication devices, based on a network distance between the units each other in case where the units each are formed by one or more communication devices.

Also, the hierarchy structure creation section may form the hierarchy structure by grouping, as each of the units of communication devices, nodes having an identical subnet.

According to another aspect of the present invention, there is provided a medium that has recorded therein, readably by a computer, a network device management program which makes a computer generate distribution routes for transmitting distribution information via communication devices, in order to distribute information to plural communication devices connected to a network, and execute network device management of transmitting the distribution information in accordance with the generated distribution routes, the program comprising: a hierarchy structure creation step that creates, based on units and the number of communication devices to which the distribution information is to be transmitted, a hierarchy structure constituted by the units of communication devices as constitutional elements; and a distribution control step that controls distribution of the distribution information, by use of the hierarchy structure created in the hierarchy structure creation step.

In the hierarchy structure creation step in the network device management program, if the hierarchy structure is constructed from an uppermost level where n is the number of the units of communication devices, x is the identical number of other units of communication devices than one of the units of communication devices through which the distribution information is to be distributed to the other units, and y is the number of layers constituting the hierarchy structure, the hierarchy structure is created so as to minimize the value of x×y which satisfies:

$$\Sigma x^i (\text{where } i=1 \text{ to } y-1) \leq n < \Sigma x^i (\text{where } i=1 \text{ to } y).$$

Also, in the hierarchy structure creation step, if there are plural combinations each of which minimizes the value of x×y, the hierarchy structure is created by selecting one of the combinations which minimizes $\Sigma x^i - n$ (where i=1 to y).

Also, in the hierarchy structure creation step, if there are plural combinations each of which minimizes $\Sigma x^i - n$ (where i=1 to y), the hierarchy structure is created by selecting a combination in which the value of x is greater.

In the hierarchy structure creation step, the hierarchy structure may be created so as to distribute the distribution information to the communication devices in order from a communication device having a shorter network distance between two of the units of communication devices.

Also, in the hierarchy structure creation step, if a distribution order of communication devices is given, the hierarchy structure may be created by assigning the units of communication devices to the hierarchy structure, on the basis of the distribution order.

Also, in the hierarchy structure creation step, the units of communication devices each may be formed as an independent distribution group including no overlapping part, by collecting together parts common to the distribution order.

Also, in the hierarchy structure creation step, the units of communication devices each may be formed by assigning one or more communication devices, based on a network distance between the units each other in case where the units each are formed by one or more communication devices.

Further, in the hierarchy structure creation step, the hierarchy structure may be formed by grouping, as each of the units of communication devices, nodes having an identical subnet.

According to further another aspect of the present invention, there is provided a network device management method for generating distribution routes for transmitting distribution information via communication devices, in order to distribute information to plural communication devices connected to a network, and making the distribution information be transmitted in accordance with the generated distribution routes, the method comprising: a hierarchy structure creation step that creates, based on units and the number of communication devices to which the distribution information is to be transmitted, a hierarchy structure constituted by the units of communication devices as constitutional elements; and a distribution control step that controls distribution of the distribution information, by use of the hierarchy structure created in the hierarchy structure creation step.

As has been described above, according to the present invention, total distribution time can be reduced and information can be efficiently distributed when the information is distributed to a huge number of communication devices forming a network.

DETAILED DESCRIPTION OF THE PREFERRED EMBODIMENTS

Embodiments of the present invention will now be described below with reference to the drawings.

Figure 1:
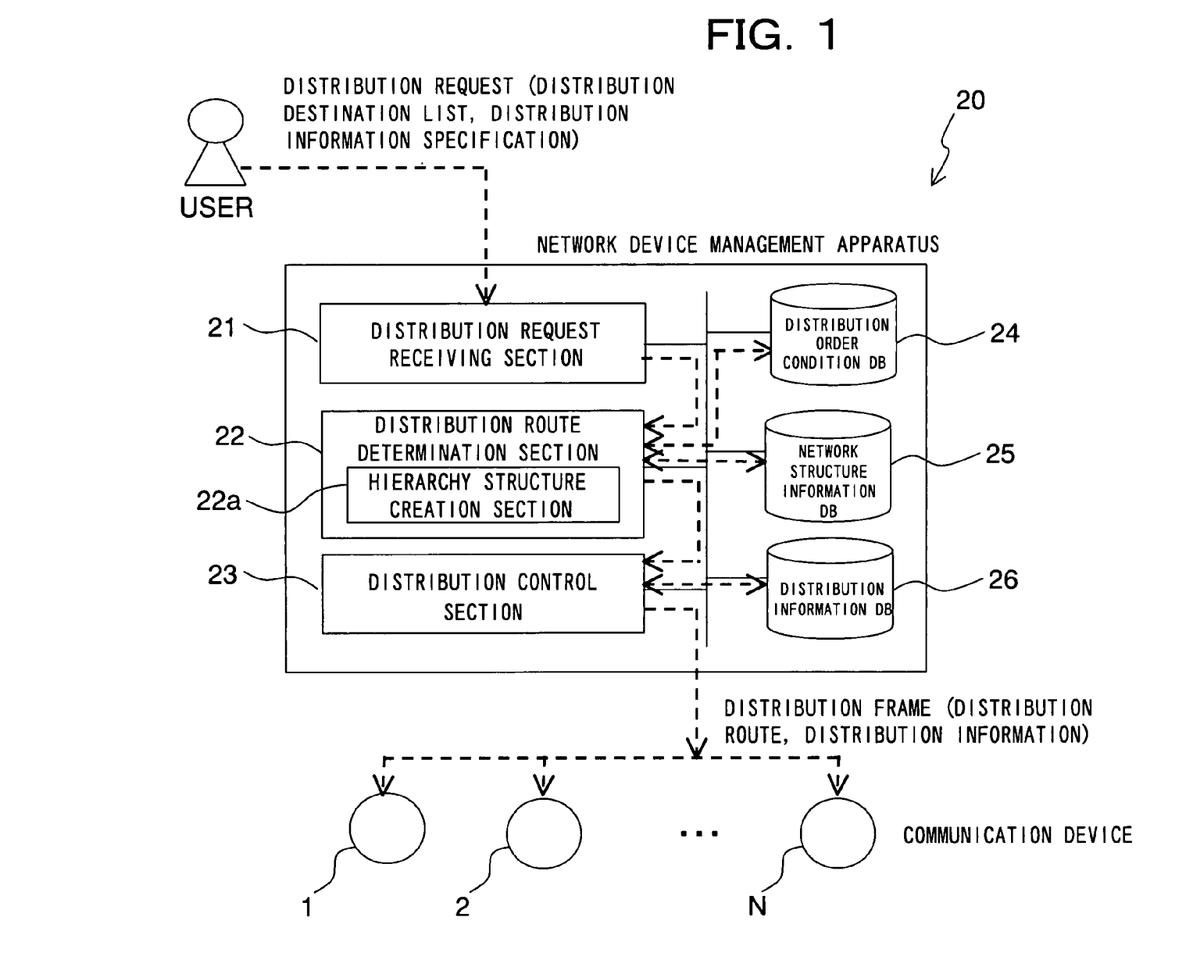
FIG. 1 is a functional block diagram showing an embodiment of the present invention.

FIG. 1 is a block diagram showing a network device management apparatus in an embodiment of the present invention.

The network management device 20 has: a distribution request receiving section 21; a distribution route determination section 22; a distribution control section 23; a distribution order condition database 24 which stores distribution order conditions; a network structure information database 25 which stores network structure information; and a distribution information database 26 which stores distribution information. The distribution route determination section 22 has a hierarchy structure creation section 22a.

The distribution request receiving section 21 receives a distribution request (e.g., a distribution destination list, a distribution information specification) from a user via a GUI (Graphical User Interface) or CLI (Command Line Interface). In accordance with the distribution request received, the distribution route determination section 22 creates and determines a distribution route through communication devices (or network devices) 1 to N. The hierarchy structure creation section 22a creates a hierarchy structure to construct a distribution route. The communication devices 1 to N mean communication devices dealt with as units. The following description will be made supposing that the communication devices 1 to N consist of one or plural units (each having one input and one output).

The distribution control section 23 controls actual distribution of distribution information in accordance with distribution routes determined by the distribution route determination section 22.

The distribution order conditions stored in the distribution order condition database 24 include a constraint condition concerning the order of setting communication devices with respect to distribution information.

Also, the network structure information stored in the network structure information database 25 includes device characteristics and inter-device characteristics (network characteristics) of communication devices as distribution destinations.

The distribution information stored in the distribution information database 26 includes control information (e.g., a program, policy/Config information) to be distributed to communication devices.

In the structure as described above, upon reception of a distribution request from a user, the distribution request receiving section 21 sends the distribution request to the distribution route determination section 22. The distribution route determination section 22 refers to the databases 24 and 25, respectively, for distribution order conditions and network structure information, and creates (or determines) distribution routes having a hierarchy structure. The distribution route determination section 22 sends the distribution routes to the distribution control section 23. The distribution control section 23 sends a distribution frame including the distribution routes and distribution information to the nearest communication device specified by the distribution routes.

Embodiment 1

Figure 2:
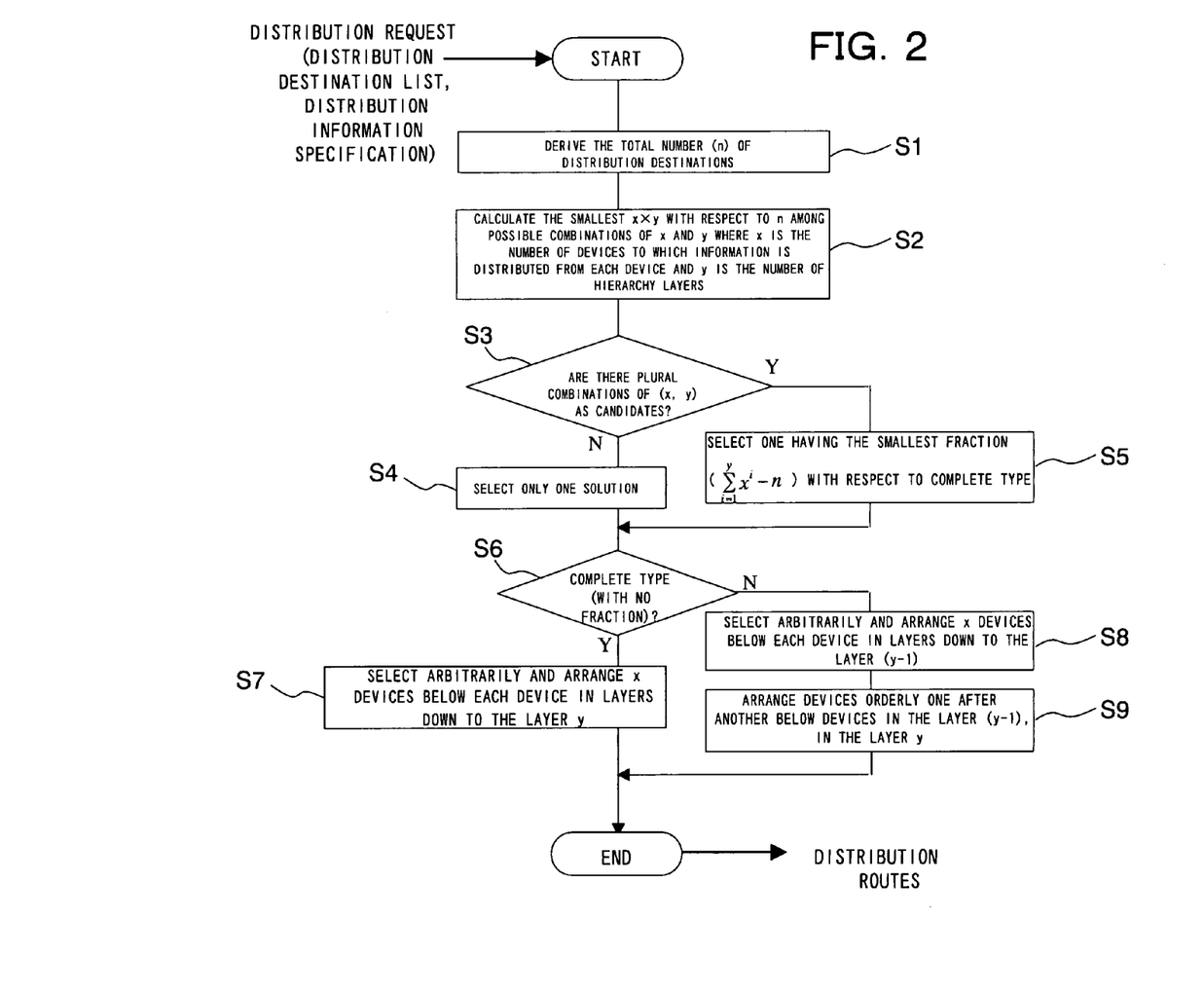
FIG. 2 is a flowchart showing operation of an embodiment 1.

FIG. 2 is a flowchart showing a method of determining routes (distribution structure creation) in the embodiment 1. In the embodiment 1, the distribution order is not particularly limited.

Upon reception of a distribution request including a distribution destination list and a distribution information specification by the distribution request receiving section 21, the hierarchy structure creation section 22a derives the total number (n) of distribution destinations from the distribution destination list, in the distribution route determination section 22 (S1).

After n is derived, such a combination of x and y that gives a minimum value of x×y is calculated among possible combinations of the number x of devices to which information should be distributed next from each communication device (hereinafter, simply referred to as a device) and the number y of hierarchy layers (S2). This calculation is achieved by sequentially checking all combinations.

If only one combination gives a minimum value (S3, N), only this one solution is selected (S4). Otherwise, if there are plural combinations that give a minimum value (S3, Y), one of the combinations that has the smallest fraction with respect to a complete form is selected (S5).

Figure 6A:
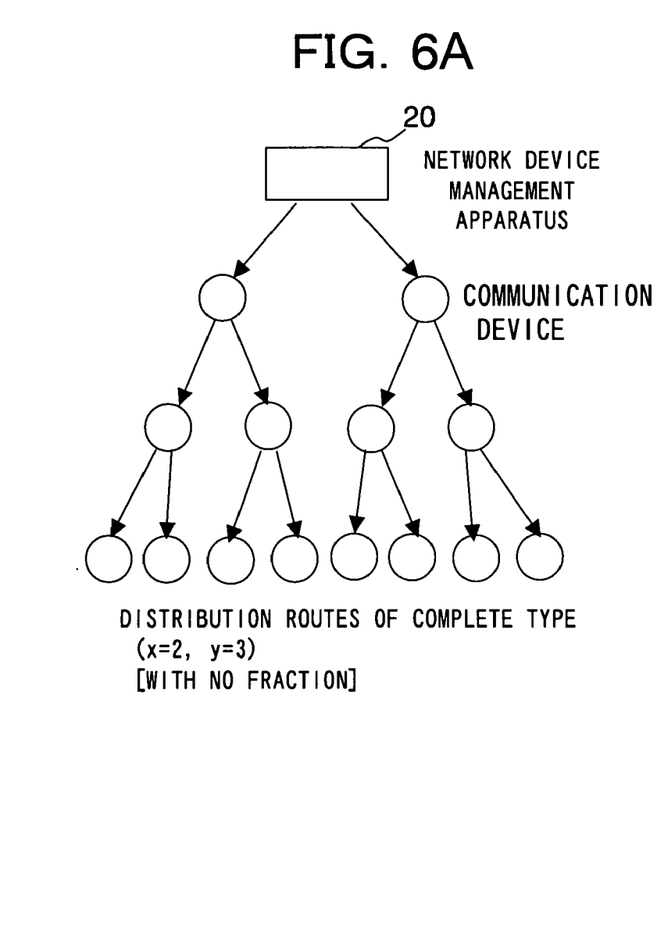
FIGS. 6A and 6B are tree views showing distribution routes of a complete type and a fractional type.

The complete form mentioned above means a form in which x devices of the devices in the final hierarchy layer (the layer y or y-th layer) are connected to every one (without any fractional device) of the devices in the one-level higher layer (the layer (y−1) or (y−1)-th layer), as shown in FIG. 6A.

Figure 6B:
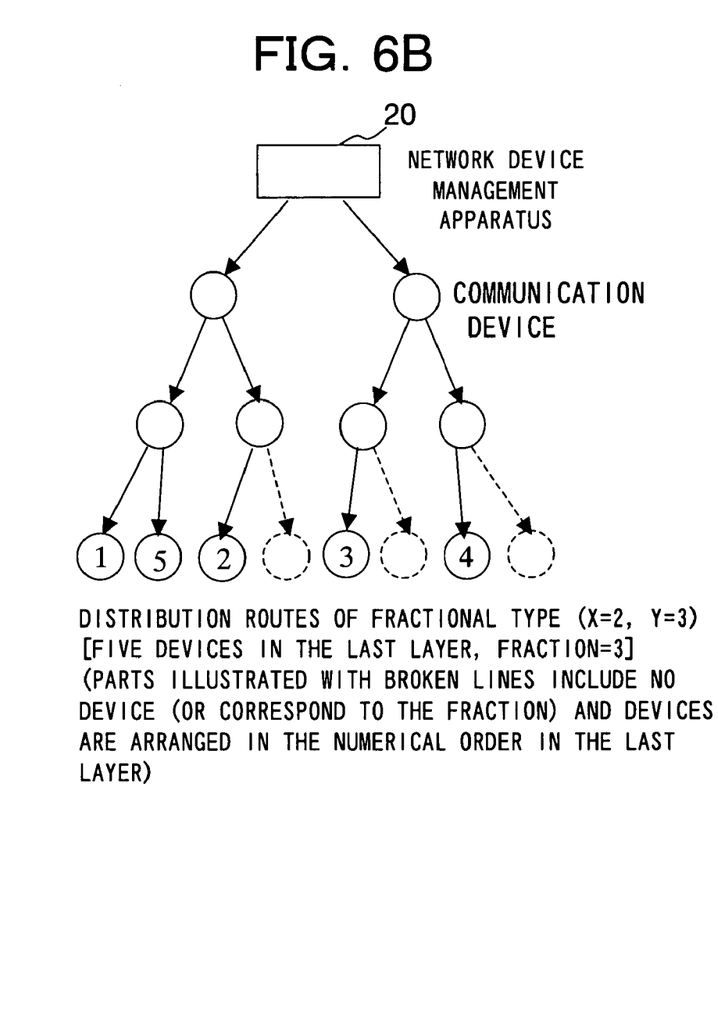

On the other side, a fractional form means a form in which x devices of the devices in the final layer are not connected (i.e., there is any fractional device) to every one of the devices in the one-level higher layer, as shown in FIG. 6B. The devices in the final layer of the fractional form are arranged in order one after another below devices in the one-level higher layer.

The fraction of the fractional form is expressed by the following expression:

$$\Sigma x^i - n$$

where i is an integer of 1 to y.

In this case, n satisfies the following condition:

$$\Sigma x^i (\text{where } i=1 \text{ to } y-1) \leq n < \Sigma x^i (\text{where } i=1 \text{ to } y)$$

In step S5, if there are such combinations that further have an equal fraction, one of the combinations that have a greater x is selected. This is to give priority to abilities of devices.

After deriving x and y, devices are arranged as follows. In case of a complete form (S6, Y), x devices are arbitrarily selected and arranged below each of the devices in layers down to the layer y (S7). Alternatively, in case of a fractional form (S6, N), x devices are arbitrarily selected and arranged below each of the devices in layers down to the layer (y−1) (S8), and devices are arranged in order one after another below devices in the layer (y−1), in the layer y (S9).

Embodiment 2

Figure 3:
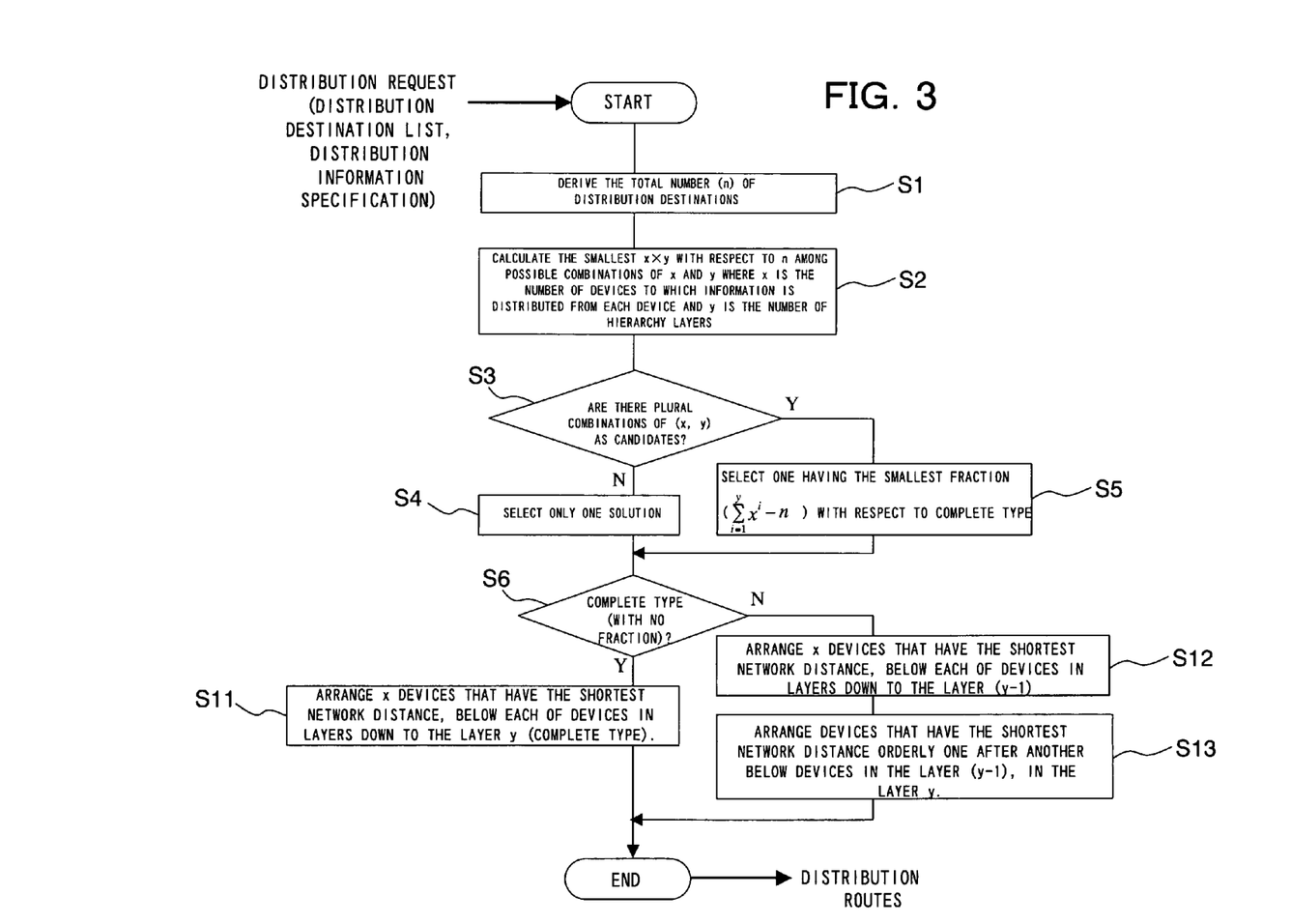
FIG. 3 is a flowchart showing operation of an embodiment 2.

FIG. 3 is a flowchart showing a method of determining routes (distribution structure creation) according to the embodiment 2. In the embodiment 2, the distribution order is not particularly limited either. The steps (S1 to S6) in FIG. 3 up to derivation of x and y, as described with reference to FIG. 2, are the same as those in FIG. 2.

The layout of devices after derivation of x and y will be as follows. That is, in case of a complete form (S6, Y), such x devices that have the shortest network distance are arranged below each of devices in layers down to the layer y (S11). Alternatively, in case of a fractional form (S6, N), x devices that have the shortest network distance are arranged below each of devices in layers down to the layer (y−1) (S12), and devices are arranged one after another in order below devices in the layer (y−1), in the layer y (S13).

Embodiment 3

Figure 4:
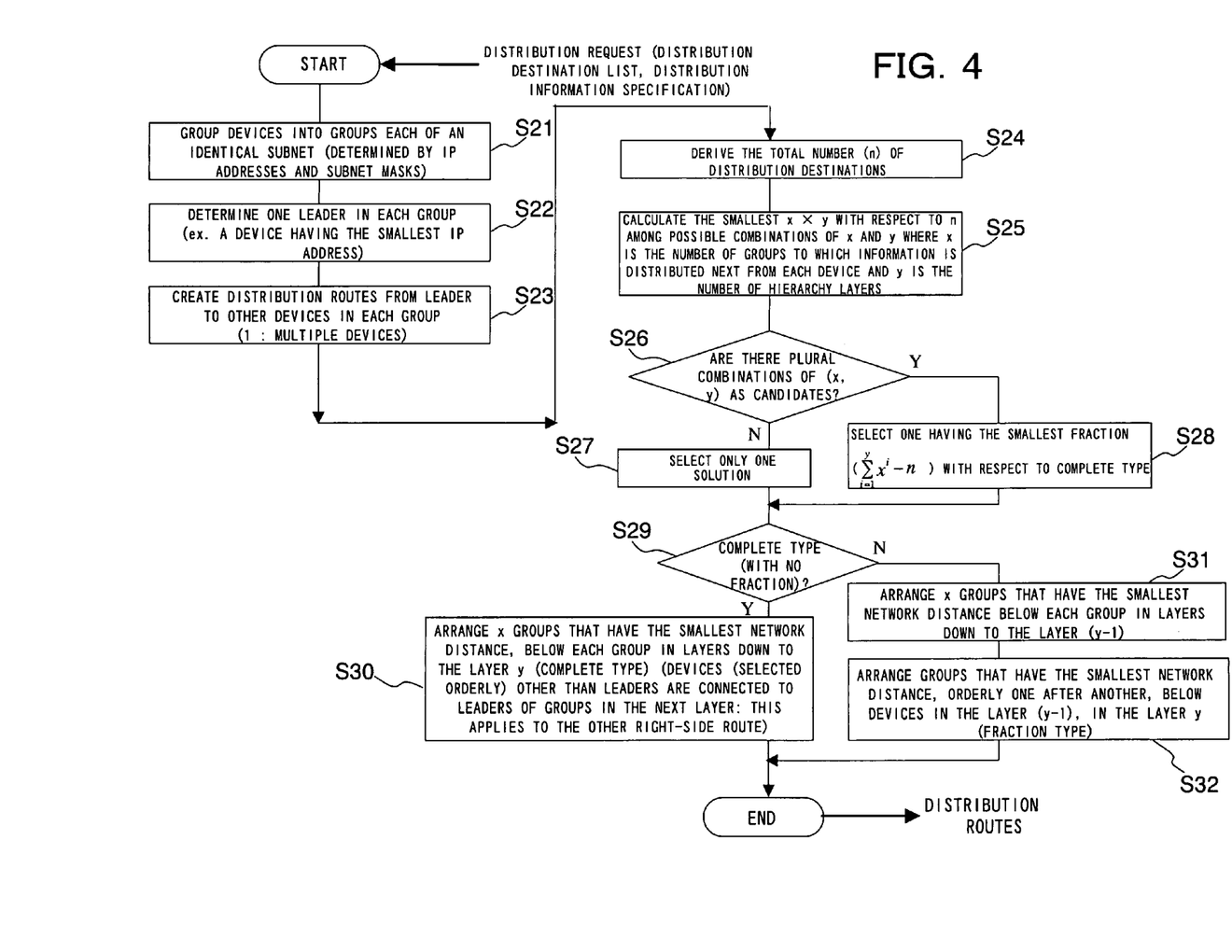
FIG. 4 is a flowchart showing operation of an embodiment 3.

FIG. 4 is a flowchart showing a method of determining routes (distribution structure creation) according to the embodiment 3. In the embodiment 3, the distribution order is not particularly limited either.

Upon reception of a distribution request, devices as distribution destinations are firstly grouped into groups each consisting of those devices that have one identical subnet (S21). In this case, whether or not a device should be included in a group is determined depending on the IP address and netmask of the device.

After the grouping, one device to become Leader is determined in each of the groups (S22). For example, a device having the smallest IP address may be determined as Leader. After determining Leaders, distribution routes from one Leader to other devices (1:plural devices) are created in each of the groups (S23).

From the above, the total number n of created groups is derived (S24).

With respect to the derived n, such a combination of x and y that gives a minimum value of x×y is calculated among possible combinations of the number x of groups to which information should be distributed next from each group and the layer number y of hierarchy layers (S25). This calculation is achieved by sequentially checking all combinations.

If only one combination gives a minimum value (S26, N), only this one solution is selected (S27). Otherwise, if there are plural combinations that give a minimum value (S26, Y), one of the combinations that has the smallest fraction with respect to a complete form is selected (S28).

In step S28, if there are such plural combinations that have an equal fraction, one of the combinations that has a greater x is selected.

In the above, the procedure of deriving x and y is equivalent to the procedure of FIG. 2, in which the devices (each being a form of a unit of a communication device) as targets (each being another form of unit of communication device) to be arranged are substituted with groups.

After deriving x and y, devices are arranged as follows. In case of a complete form (S29, Y), such x groups that have the shortest network distance are arranged below each of the groups in layers down to the layer y (S30). At this time, those devices (selected orderly one after another) that are not Leaders are connected to Leaders in groups in the one-level lower layer groups. This processing procedure is common to steps S31 and S32 which will be described later.

Alternatively, in case of a fractional type (S29, N), such x groups that have the shortest network distance are arranged below each of the groups in layers down to the layer (y−1) (S31). In the layer y, groups that have the shortest network distance are arranged orderly one after another below groups in the layer (y−1) (S32). Also, the arranging procedure in this step is equivalent to that in FIG. 3, in which the devices as targets to be arranged are substituted with groups.

Embodiment 4

Figure 5:
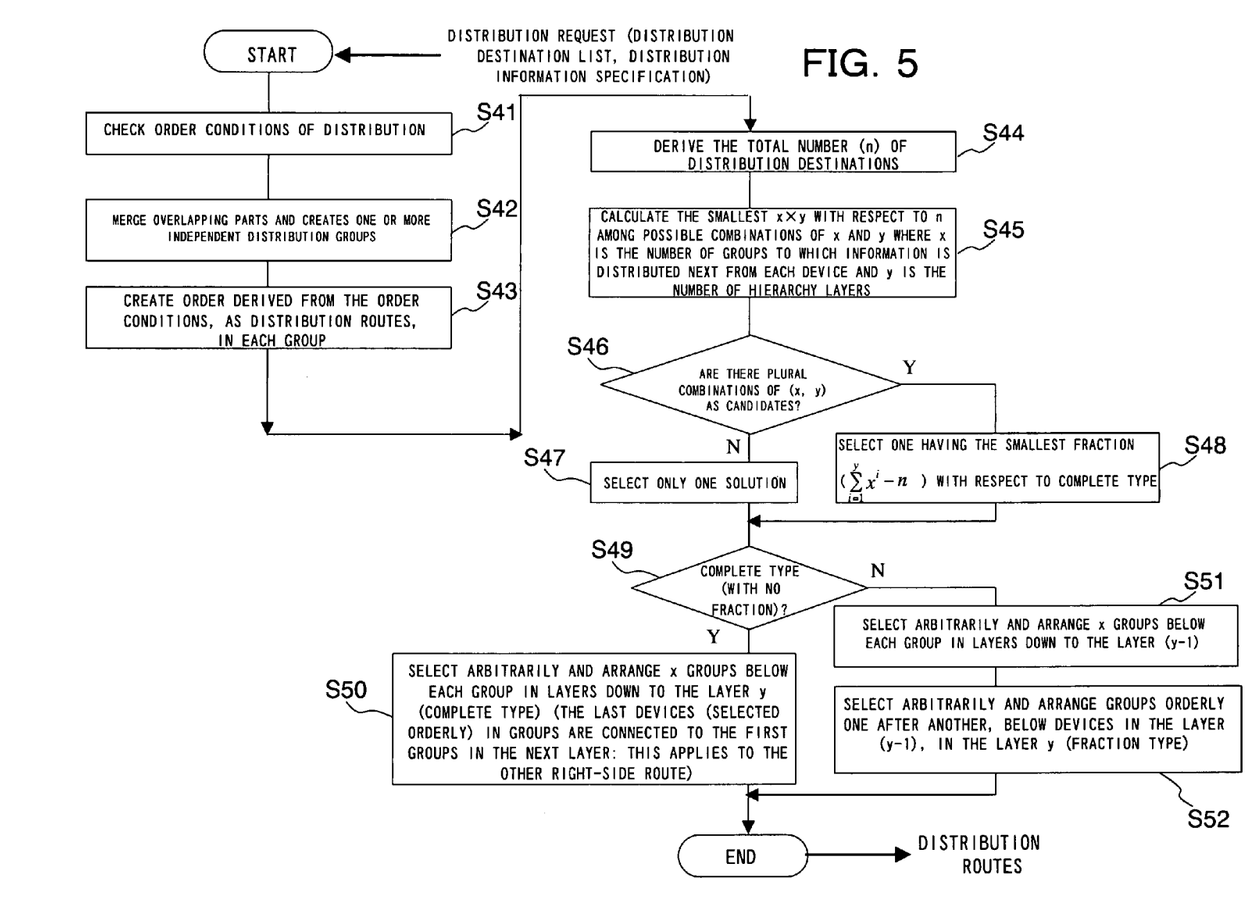
FIG. 5 is a flowchart showing operation of an embodiment 4.

FIG. 5 is a flowchart showing a method of determining routes (distribution structure creation) according to the embodiment 4. In the embodiment 4, consideration is taken into the distribution order.

Upon reception of a distribution request, order conditions concerning the order of distribution are checked (S41).

Next, with respect to the order conditions, those parts that overlap each other are merged to create one or more independent distribution groups (S42). In each of the one or more groups, the order of devices which is derived from the order conditions is created as distribution routes (S43). From the above, the total number of groups created is derived (S44).

Next, with respect to the derived n, such a combination of x and y that gives a minimum value of x×y is calculated, among possible combinations of the number x of groups to which each group should distribute information next, and the number y of hierarchy layers (S45). This calculation is achieved by sequentially checking all combinations.

If only one combination gives a minimum value (S46, N), only this one solution is selected (S47).

Otherwise, if there are plural combinations that give a minimum value (S46, Y), one of the combinations that has the smallest fraction with respect to a complete form is selected (S48). The procedure of deriving x and y in this step is equivalent to that in FIG. 2, in which the devices as targets to be arranged are substituted with groups.

After deriving x and y, devices are arranged as follows. In case of a complete form (S49, Y), x groups are arbitrarily selected and arranged below each of the groups in layers down to the layer y (S50). At this time, the last devices respectively in the groups (selected one after another in an order) are connected to the first devices respectively in the groups in the next layer. This processing is common to the steps S51 and S52 which will be described later.

Alternatively, in case of a fractional form (S49, N), x groups are arbitrarily selected and arranged below each of the groups in layers down to the layer (y−1) (S51). In the layer y, groups are arranged one after another in an order below groups in the layer (y−1) (S52). Also, the layout procedure in this step is equivalent to that in FIG. 2, in which the devices as targets to be arranged are substituted with groups.

EXAMPLES

Examples of the embodiments described above will now be described.

Figure 7:
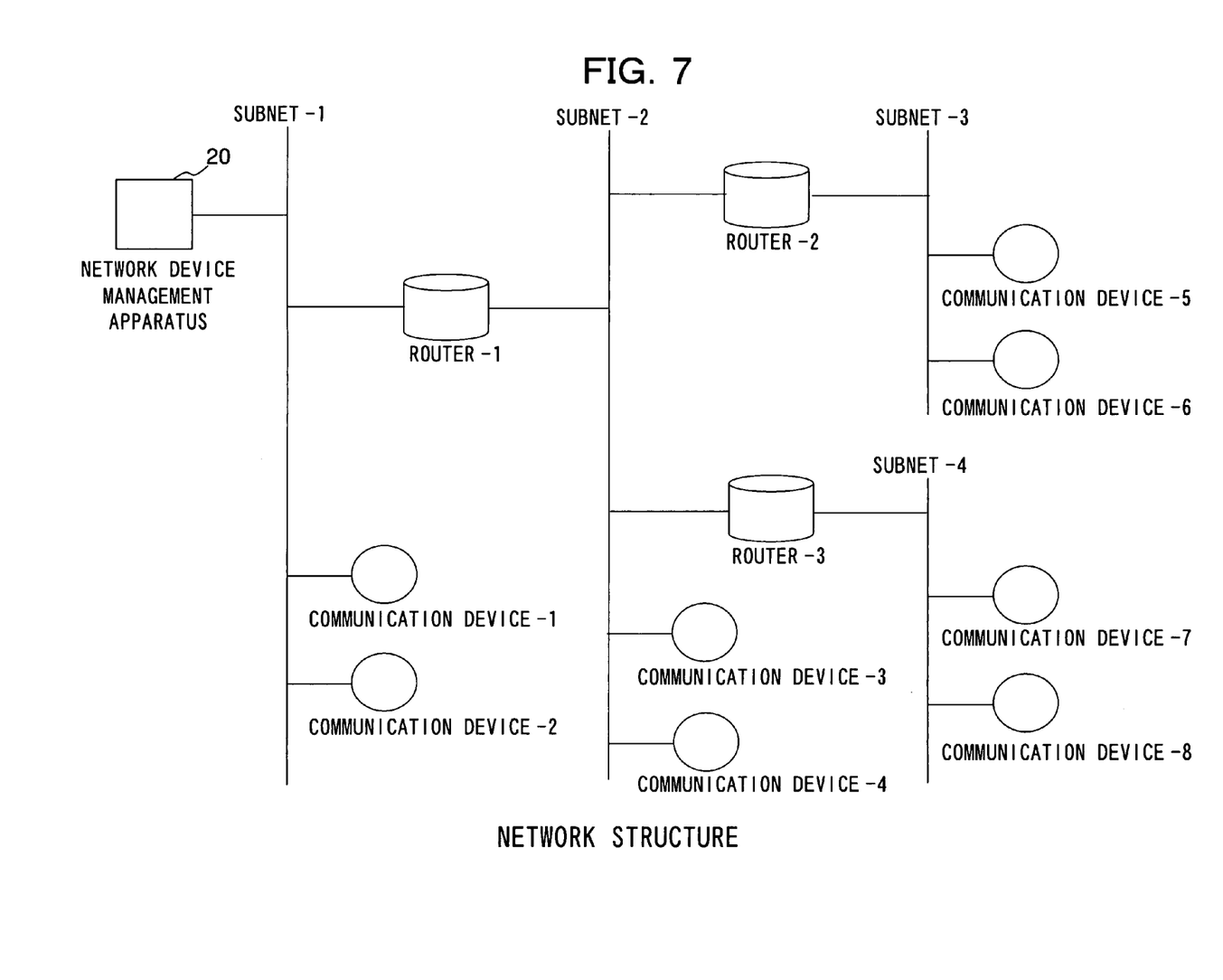
FIG. 7 is a network structure view for explaining an example of the present invention.
Figure 8:
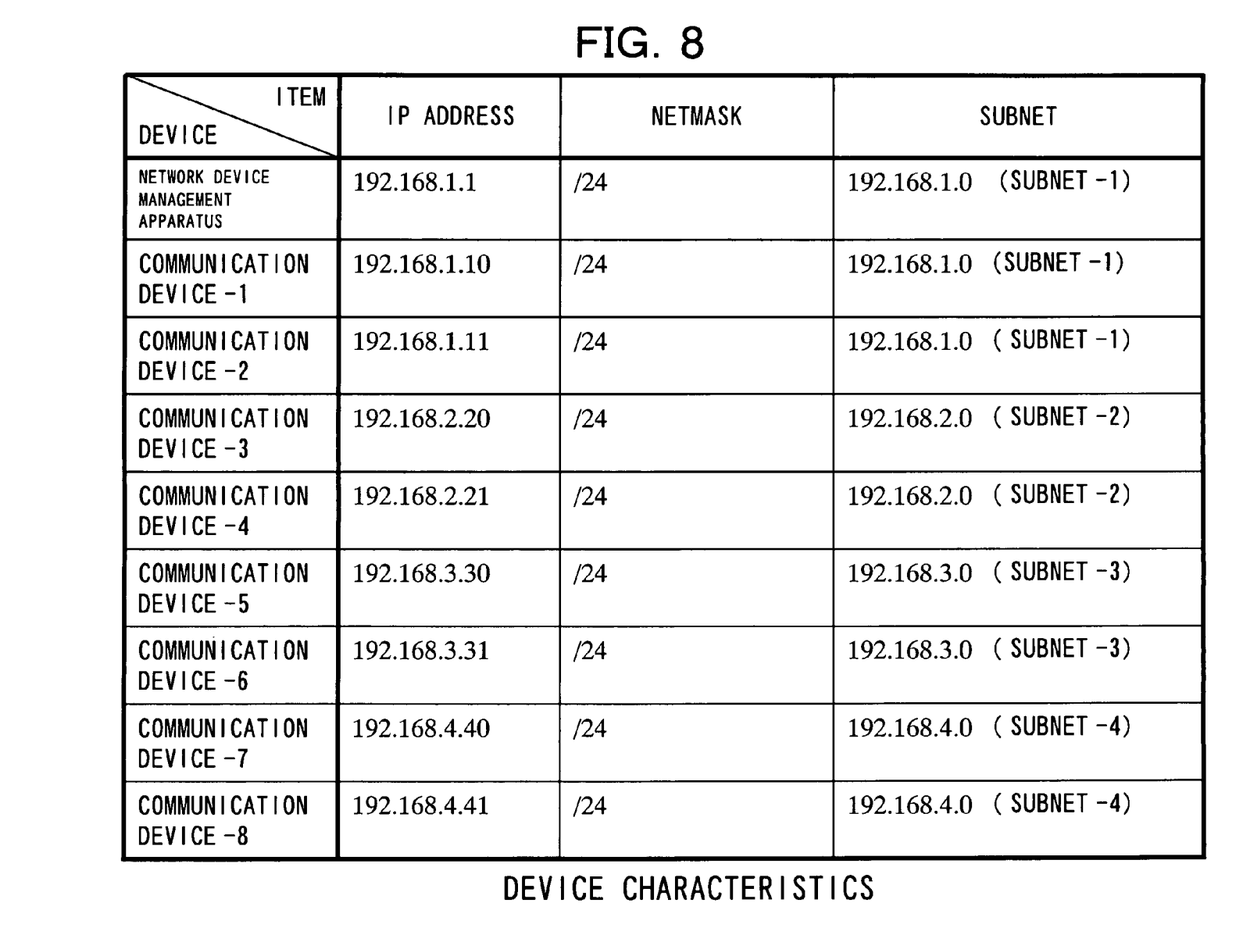
FIG. 8 is a table showing device characteristics.
Figure 9:
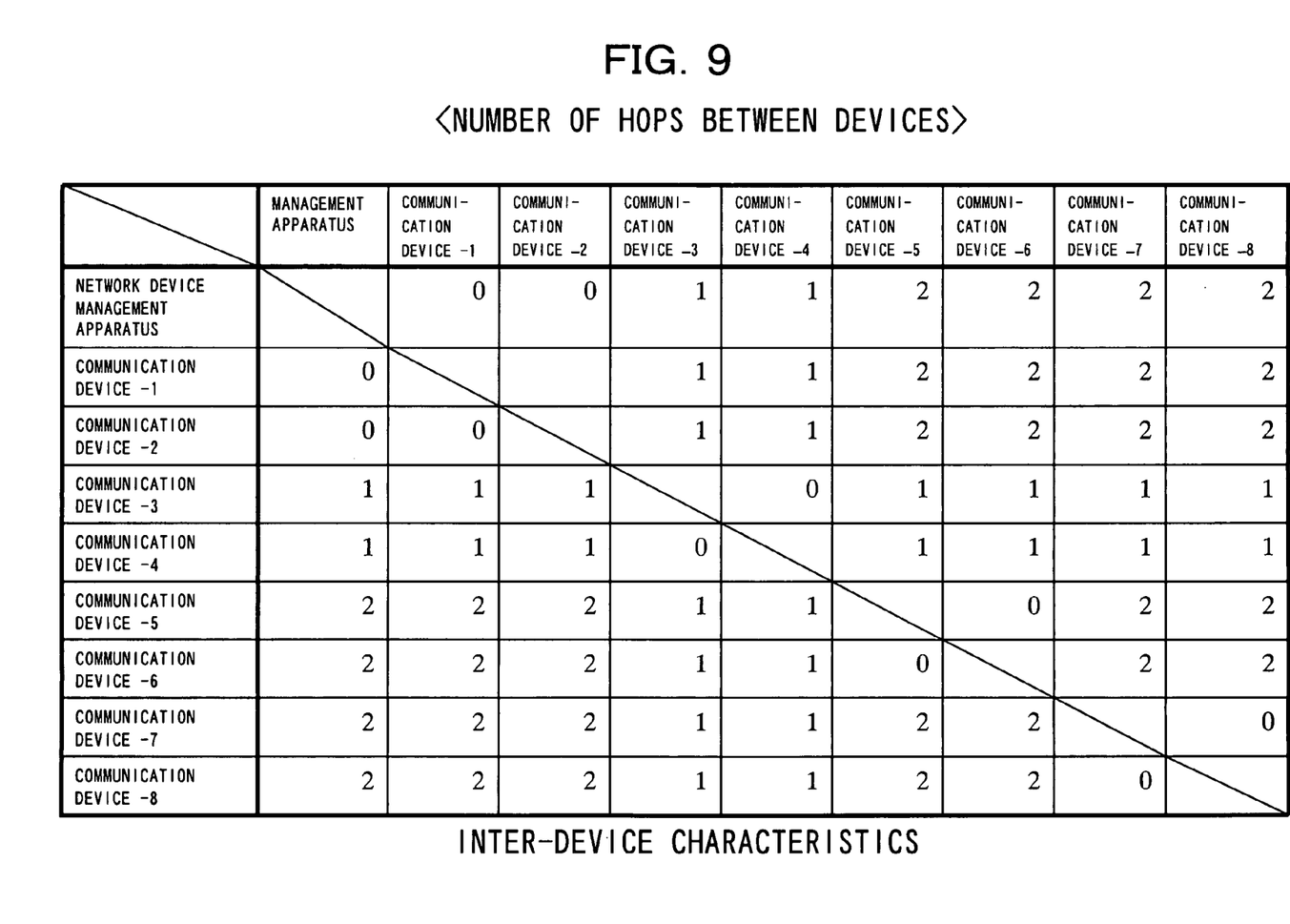
FIG. 9 is a table showing inter-device characteristics.

FIG. 7 is a diagram showing a network structure for explaining the examples. FIGS. 8 and 9 are tables showing device characteristics of this network structure (IP addresses, netmasks, subnets) and inter-device characteristics (e.g., the number of hops between devices).

Example 1

An example of the embodiment 1 will now be described.

The total number n of distribution destinations is checked after a distribution request arrives. In this case, it is supposed that information is distributed to all communication devices (1 to 8) shown in FIG. 7. This supposition is common to examples 2 to 4 which will be described below.

Since the number of devices as distribution targets is eight, possible combinations of (x, y) are (1, 8), (2, 3), (3, 2), (4, 2), (5, 2), (6, 2), (7, 1), and (8, 1).

Of these combinations, two combinations (2, 3) and (3, 2) each minimize x×y. However, fractions which the two combinations have with respect to a complete form are 6 and 3, respectively. Hence, the combination (3, 2) which has the smaller fraction is selected.

Figure 10:
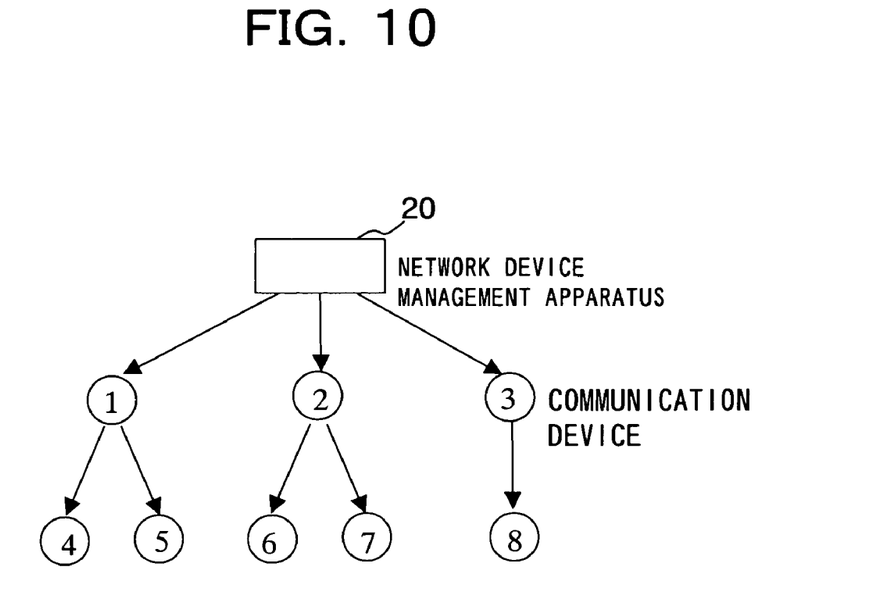
FIG. 10 is a tree view showing distribution routes in an example 1 corresponding to the embodiment 1.

Accordingly, the devices are arranged in the order of device number. In the final layer where fractions appear, the devices are arranged one after another in order. Distribution routes obtained as a result of this are shown in FIG. 10.

Example 2

An example of the embodiment 2 will now be described.

In the example 2, the method of obtaining a combination of (x, y) described above is identical to that in the case of the example 1, and is determined to be (3, 2).

Figure 11:
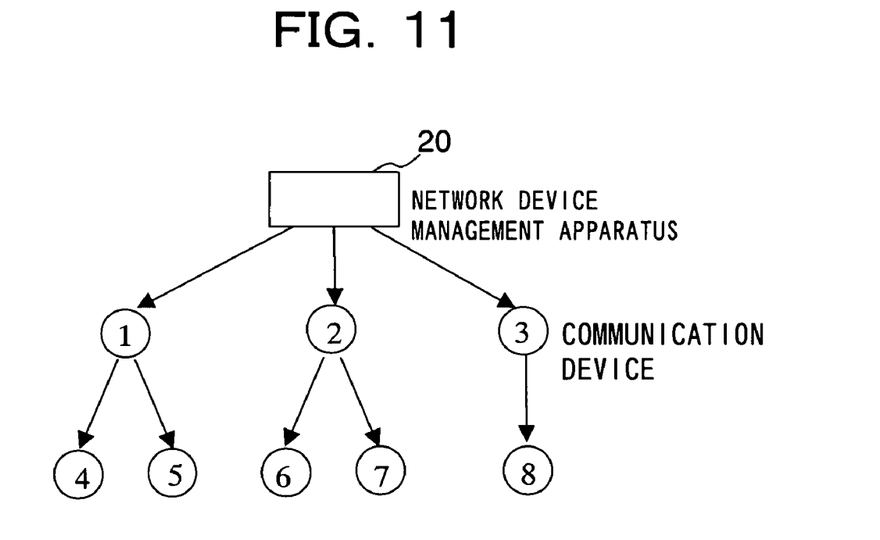
FIG. 11 is a tree view showing distribution routes in an example 2 corresponding to the embodiment 2.

To select devices, devices to which each device directly distributes information are selected among those devices that have the shortest network distance (which is the number of hops shown in FIG. 9). Devices 1, 2, and 3 are arranged below (or in the first layer) a network device management apparatus 20 as a parent. In the second layer as the final layer, devices are selected and arranged one after another from those devices that have the shortest network distance (e.g., the number of hops) among remaining devices, until all the devices are arranged. The structure of distribution routes obtained as a result is shown in FIG. 11.

Example 3

An example of the embodiment 3 will be described below.

In response to a distribution request, devices are firstly grouped into groups each consisting of those devices that have one identical subnet. According to the column of subnets of the device characteristics (which are maintained as a database in the network structure information in FIG. 1) shown in FIG. 8, groups each consisting of devices that belong to one identical subnet are: devices 1 and 2; devices 3 and 4; devices 5 and 6; and devices 7 and 8.

One device that has the smallest IP address is selected as Leader, from each group. The selected devices are respectively the devices 1, 3, 5, and 7.

In each group, distribution routes (1:plural devices) from Leader to the other devices are created as follows.

Routes from the device 1 to the device 2, from the device 3 to the device 4, from the device 5 to the device 6, and from the device 7 to the device 8 are created.

The total number of created groups are four. With respect to this, possible combinations of (x, y) are (1, 4), (2, 2), and (4, 1).

In every one of these combinations, x×y gives four. However, fractions with respect to a complete form are respectively 0, 2, and 0, and therefore, (1, 4) or (4, 1) is possible. In this case, the structure of (4, 1) which has a greater number of distribution routes from the network device management apparatus is selected.

Figure 12:
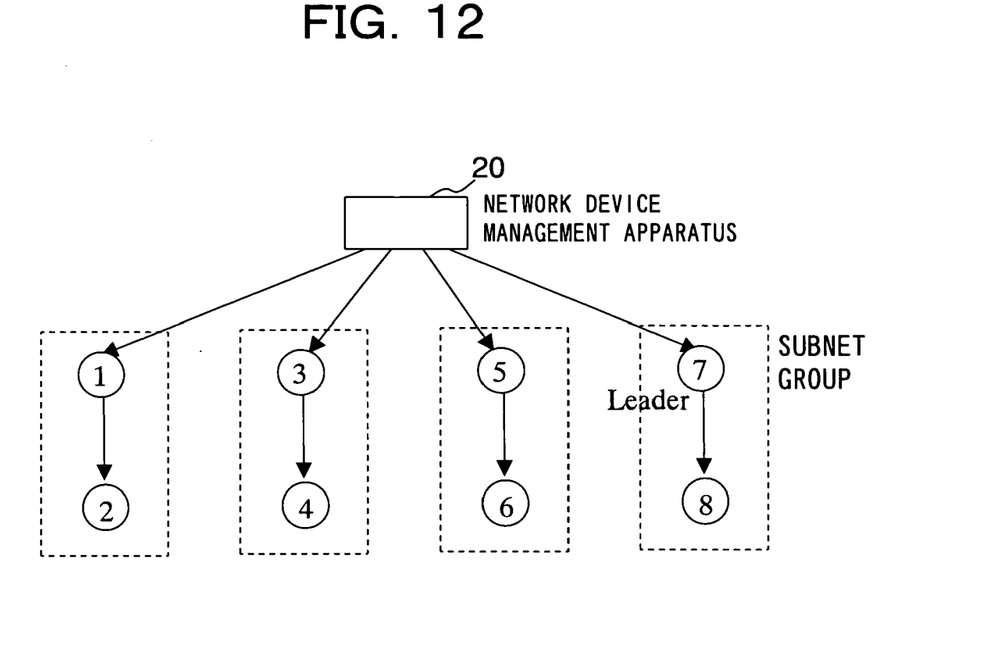
FIG. 12 is a tree view showing distribution routes in an example 3 corresponding to the embodiment 3.

According to this structure, groups are arranged. Those groups that have the shortest network distance (or the smallest hops between subnets shown in FIG. 9) are arranged below each group. In the present case, the structure 1:4 is adopted, and therefore, it does not cause this situation. However, a structure of distribution routes obtained as a result is shown in FIG. 12.

Example 4

An example of the embodiment 4 will now be described.

Figure 14A:
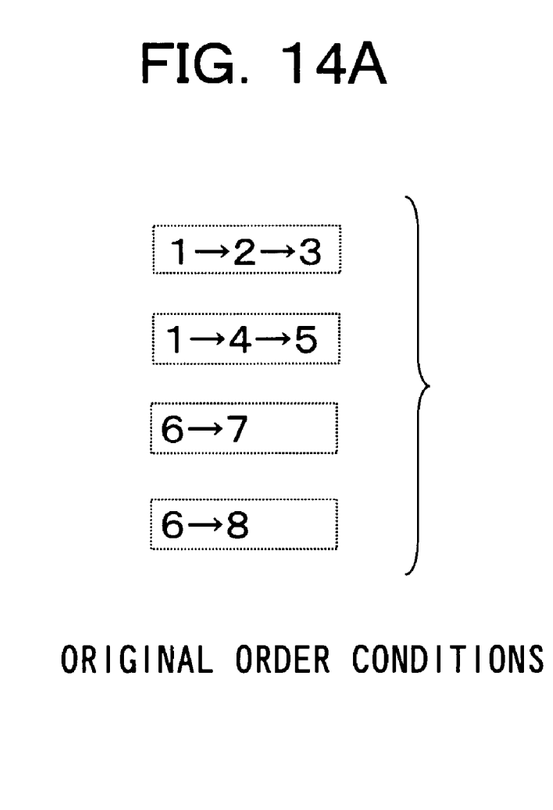
FIGS. 14A and 14B show order conditions.

In response to a distribution request, order conditions concerning the order of distribution are checked firstly. Suppose that the order conditions shown in FIG. 14A are defined as distribution order conditions (which are maintained as a database in the distribution order condition DB shown in FIG. 1).

Figure 14B:
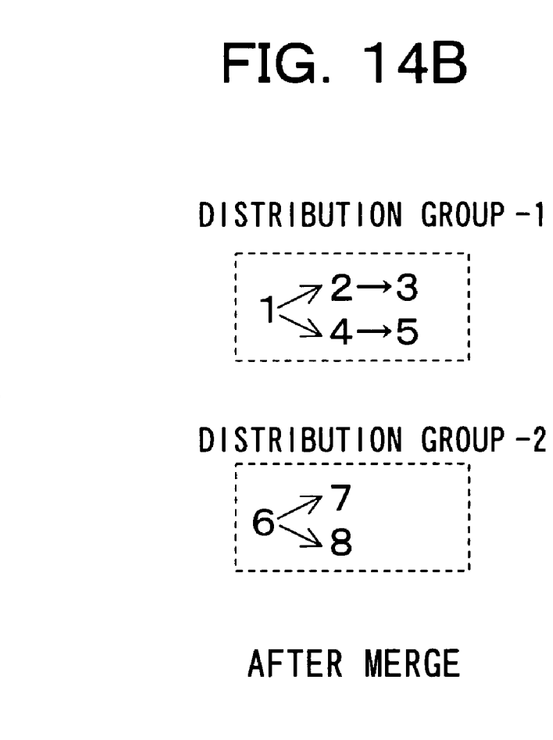

Thus, overlapping parts are merged, and one or more independent distribution groups are created. Then, a structure shown in FIG. 14B is obtained (wherein the device 1 is common to the first and second order conditions, as well as the device 6 to the third and fourth order conditions).

In each group, an order derived from the order conditions is created as distribution routes. Then, the same structure as shown in FIG. 14B is obtained. The total number of created groups is two. With respect to this, possible combinations of (x, y) are:

(1, 2) and (2, 1)

In every one of these combinations, x×y gives two. However, with respect to a complete form, both combinations have a fraction of 0. In this case, the structure of (2, 1) which has a greater number of distribution routes from the network device management apparatus is selected.

Figure 13:
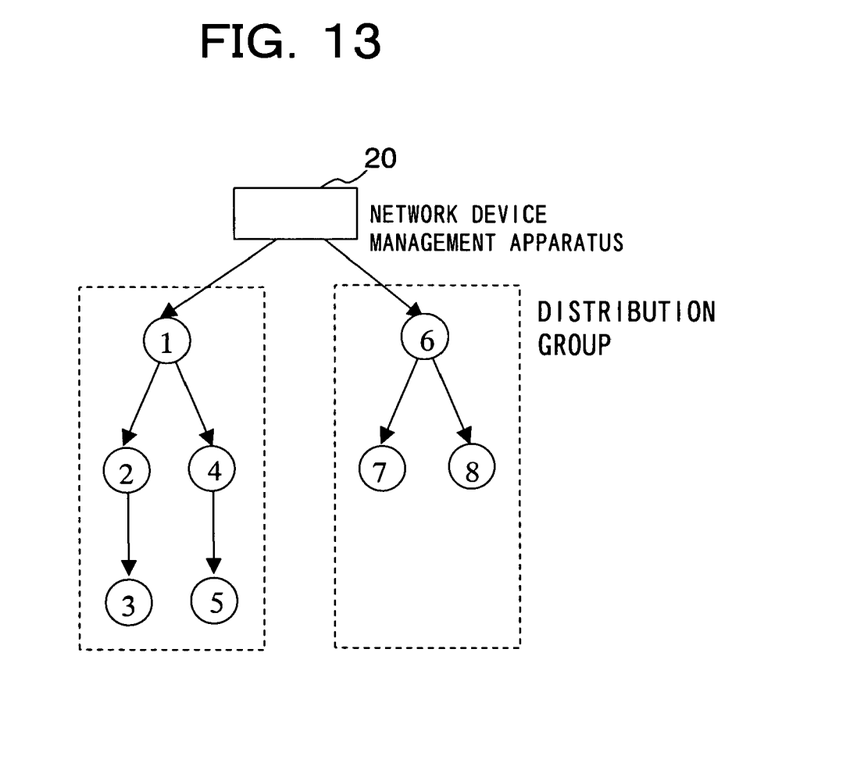
FIG. 13 is a tree view showing distribution routes in an example 4 corresponding to the embodiment 4.

According to this structure, groups are arranged. The groups are arbitrarily arranged below each group. However, in the present case, the structure 1:2 is adopted, and therefore, a structure of distribution routes obtained as a result is shown in FIG. 13.

In the embodiments described above, a program which makes a computer execute each of the steps shown in FIGS. 2 to 5 is stored, as a network device management program, into a recording medium readable from the computer. In this way, a computer which constitutes a network device management apparatus can be made execute the program. The scope meant by a recording medium readable from a computer may include a portable storage medium such as a CD-ROM, flexible disk, DVD disk, magneto-optical disk, or IC card, a database which maintains the computer program, another computer and a database thereof.

What is claimed is:

1. A medium that has recorded therein, readably by a computer, a network device management program that causes the computer to execute a process comprising:

creating a hierarchy structure constituted by units of communication devices so that the hierarchy structure is constructed from an uppermost level in order to minimize a value of x×y which satisfies the expression $$\Sigma x^i (\text{where } i=1 \text{ to } y-1) \leq n < \Sigma x^i (\text{where } i=1 \text{ to } y),$$

where n is the number of the units of communication devices, x is the identical number of other units of communication devices than one of the units of communication devices through which information is to be distributed to the other units, and y is the number of layers constituting the hierarchy structure, the communication devices being connected to a network; and controlling each of the communication devices so as to distribute the information in order from a higher communication device indicated in the hierarchy structure created in the creating to a lower communication device indicated in the hierarchy structure.

2. The medium according to claim 1, wherein, in the creating, if there are plural combinations each of which minimizes the value of x×y, the hierarchy structure is created by selecting one of the combinations which minimizes $\Sigma x^i - n$ (where i=1 to y).

3. The medium according to claim 2, wherein, in the creating, if there are plural combinations each of which minimizes $\Sigma x^i - n$ (where i=1 to y), the hierarchy structure is created by selecting a combination in which the value of x is greater.

4. The medium according to claim 1, wherein, in the creating, the hierarchy structure is created so as to distribute the information to the communication devices in order from a communication device having a shorter network distance between two of the units of communication devices.

5. The medium according to claim 1, wherein, in the creating, if a distribution order of communication devices is given, the hierarchy structure is created by assigning the units of communication devices to the hierarchy structure, on the basis of the distribution order.

6. The medium according to claim 5, wherein, in the hierarchy structure creation step creating, the units of communication devices each are formed as an independent distribution group including no overlapping part, by collecting together parts common to the distribution order.

7. The medium according to claim 1, wherein, in the creating, the units of communication devices each are formed by assigning one or more communication devices, based on a network distance between the units each other in case where the units each are formed by one or more communication devices.

8. The medium according to claim 1, wherein, in the creating, the hierarchy structure is formed by grouping, as each of the units of communication devices, nodes having an identical subnet.

9. A network device management apparatus including a processor and a memory, comprising:

a hierarchy structure creation section that creates a hierarchy structure constituted by units of communication devices so that the hierarchy structure is constructed from an uppermost level in order to minimize a value of x×y which satisfies the expression $$\Sigma x^i(\text{where } i=1 \text{ to } y-1) \leq n < \Sigma x^i(\text{where } i=1 \text{ to } y),$$

where n is the number of the units of communication devices, x is the identical number of other units of communication devices than one of the units of communication devices through which information is to be distributed to the other units, and y is the number of layers constituting the hierarchy structure, the communication devices being connected to a network; and a distribution control section that controls each of the communication devices so as to distribute the information in order from a higher communication device indicated in the hierarchy structure created by the hierarchy structure creation section to a lower communication device indicated in the hierarchy structure.

10. The network device management apparatus according to claim 9, wherein if there are plural combinations each of which minimizes the value of x×y, the hierarchy structure creation section creates the hierarchy structure by selecting one of the combinations which minimizes $\Sigma x^i - n$ (where i=1 to y).

11. The network device management apparatus according to claim 10, wherein if there are plural combinations each of which minimizes $\Sigma x^i - n$ (where i=1 to y), the hierarchy structure creation section creates the hierarchy structure by selecting a combination in which the value of x is greater.

12. The network device management apparatus according to claim 9, wherein the hierarchy structure creation section creates the hierarchy structure so as to distribute the information to the communication devices in order from a communication device having a shorter network distance between two of the units of communication devices.

13. The network device management apparatus according to claim 9, wherein if a distribution order of communication devices is given, the hierarchy structure creation section creates the hierarchy structure by assigning the units of communication devices to the hierarchy structure, on the basis of the distribution order.

14. The network device management apparatus according to claim 13, wherein the hierarchy structure creation section forms the units of communication devices each as an independent distribution group including no overlapping part, by collecting together parts common to the distribution order.

15. The network device management apparatus according to claim 9, wherein the hierarchy structure creation section forms the units of communication devices each by assigning one or more communication devices, based on a network distance between the units each other in case where the units each are formed by one or more communication devices.

16. The network device management apparatus according to claim 9, wherein the hierarchy structure creation section forms the hierarchy structure by grouping, as each of the units of communication devices, nodes having an identical subnet.

17. A network device management method applied to a network device management apparatus, the method comprising:

creating a hierarchy structure constituted by units of communication devices so that the hierarchy structure is constructed from an uppermost level in order to minimize a value of x×y which satisfies the expression $$\Sigma x^i(\text{where } i=1 \text{ to } y-1) \leq n < \Sigma x^i(\text{where } i=1 \text{ to } y),$$

where n is the number of the units of communication devices, x is the identical number of other units of communication devices than one of the units of communication devices through which information is to be distributed to the other units, and y is the number of layers constituting the hierarchy structure, the communication devices being connected to a network; and controlling each of the communication devices so as to distribute the information in order from a higher communication device indicated in the hierarchy structure created in the creating to a lower communication device indicated in the hierarchy structure.

\* \* \* \* \*